United States Patent [19]

Husbands

[11] Patent Number: 4,776,041

[45] Date of Patent: Oct. 4, 1988

[54] COLLISION DETECTION IN A FIBER OPTIC LOCAL AREA NETWORK

[75] Inventor: Charles R. Husbands, Acton, Mass.

[73] Assignee: The Mitre Corporation, Bedford, Mass.

[21] Appl. No.: 937,733

[22] Filed: Dec. 4, 1986

[51] Int. Cl.[4] ................................ H04B 9/00

[52] U.S. Cl. ................................ 455/607; 455/601; 455/606

[58] Field of Search ................ 370/85, 94; 455/601, 455/606, 607.

[56] References Cited

U.S. PATENT DOCUMENTS

| | | | |
|---|---|---|---|
| 4,472,712 | 9/1984 | Ault et al. | 370/85 |
| 4,531,238 | 7/1985 | Rawson et al. | 455/607 |
| 4,580,872 | 4/1986 | Bitatt et al. | 455/612 |
| 4,628,501 | 12/1986 | Loscoe | 455/612 |
| 4,644,587 | 2/1987 | Takahashi et al. | 455/607 |
| 4,646,361 | 2/1987 | Usui | 455/601 |

OTHER PUBLICATIONS

Schmidt, Fibernet II: A Fiber Optic Ethernet, IEEE Journal on Selected Areas in Communications, vol. SAC-1, No. 5, Nov. 1983, pp. 702-711.

Reedy, Methods of Collision Detection in Fiber Optic CSMAICD Networks, IEEE, Journal on Selected Areas in Communications, vol. SAC-3, No. 6, Nov. 1985, pp. 890-896.

*Primary Examiner*—Michael A. Masinick

*Attorney, Agent, or Firm*—Wolf, Greenfield & Sacks

[57] ABSTRACT

The fiber optic local area network includes an active star node including a plurality of optical receivers and transmitters. A logic element is interconnected with the output of each of the receivers in the node to detect simultaneous transmissions on the network. When simultaneous transmissions are detected, a collision signal is generated and this signal is transmitted by the node transmitters onto the network.

3 Claims, 3 Drawing Sheets

COLLISION DETECTION IN A FIBER OPTIC LOCAL AREA NETWORK

BACKGROUND OF THE INVENTION

This invention relates to a local area networks and more particularly to collision detection in a fiber optic local area network.

One of the more interesting problems in the implementation of fiber optic local area networks, designed to service the Ethernet protocol, has been the development of collision detection techniques. J. P. Reedy and J. R. Jones in "Methods of Collision Detection in Fiber Optic CSMA/CD Networks," IEEE Journal on Selected Areas Communications, Vol. SAC-3, No. 6, November 1985, explored a number of collision detection techniques. There are a number of architectures currently under development to implement the Ethernet protocol in a fiber optic local area network. One of the early proposals for implementation of collision detection in a fiber optic LAN configuration was Fibernet II. See R. V. Schmidt, E. G. Rawson, R. E. Norton, Jr., S. B. Jackson, and M. D. Bailey, "Fibernet II: A Fiber Optic Ethernet," IEEE Journal of Selected Areas Communications, Vol. SAC-1, No. 5, pp 702–711, November 1983. The mechanization set forth in this paper is shown in FIG. 1. In FIG. 1, a fiber optic transceiver 10 (optical modem) associated with a user terminal 12 converts the electrical output from an Ethernet controller card 14 to optical format. At a Fibernet II node 16, the optical energy is converted back to electrical format. These signals pass through the node 16 and are imposed on a standard baseband backplane 18. Collision detection is implemented using an amplitude comparison technique on the backplane 18. This is the same technique that is used in the standard baseband coaxial Ethernet configuration. As all collision detection is done by conventional Ethernet hardware in this active node, the confidence level of accurately detecting collisions is very high.

A more commonly used form of collision detection on fiber optic LAN configurations using Ethernet protocol employs a passive star node and smart optical terminal modems. See, M. H. Coden and F. W. Scholl, "Implementation of A Fiber Optic Ethernet Local Area Network," Proc. SPIE (Fiber Optics Multiplexing and Modulation), Vol. 417, April 1983, pp 48–52. A diagram of this configuration is shown in FIG. 2. In this technique, logic contained in an optical modem 20 monitors for variations between its transmitted signal and the return signal after passing through a passive star element 22. This technique closely resembles the collision detection scheme used in the transceiver tap on the baseband coaxial Ethernet implementation. For small passive star node designs this technique works well. However, as the leg to leg variations on the network start to exceed 3 dB or 4 dB the collision detection capability of the logic rapidly diminishes. Such leg to leg variations can be caused by large differential transmission path losses or manufacturing variability in the construction of large star devices.

To compensate for this increased uncertainty in the ability to recognize collisions with variations in network designs, a hybrid star node design has been developed. See the Reedy and Jones reference set forth above. This design employs both a passive star and a number of active supporting components to provide a higher accuracy level in the detection of collision. A diagram of such a mechanization is shown in FIG. 3. In this design, a small amount of optical energy is tapped from each of the input legs on the star. The energy from each of the taps 24 is converted to electrical form by a separate optical receiver 26. The electrical signal from each of the receivers 26 is compared to establish that no more than one optical modem is transmitting at the same time. If a simultaneous transmission of energy is detected, a 10 MHz oscillator 28 is energized. The output of the oscillator 28 is converted to optical format and coupled into one of the input legs on a passive star 30 reserved for this purpose. The star element 30 distributes the signal to each of the optical modems. At the modem, the oscillator signal is detected and passed onto the Ethernet controller card as a collision indicator. This technique has a very high certainty of detecting collisions. However, the mechanization is quite awkward. The taps 24 steal some optical power margin, individual receivers and logic is needed in addition to the passive star element and one of the legs of the star element must be reserved for the transmission of the collision detection signal.

It is therefore a primary object of the present invention to provide a collision detection technique which overcomes the problems known in the prior art.

Yet another object of the present invention is a simple mechanization able to detect collisions with a high level of confidence.

Yet another object of the invention is a collision detection technique requiring little additional logic elements.

SUMMARY OF THE INVENTION

These and other objects of the invention are achieved by means of collision detection apparatus in a local area network having an active star node including a plurality of optical receivers and transmitters. The node includes a logic element interconnected at the output of each of the receivers to detect simultaneous transmission on the network. A collision signal is generated when the logic element detects simultaneous transmission and the collision signal is transmitted by the transmitters onto the network. The signal is received at the user terminals as a collision indicator. In a preferred embodiment, the collision signal has a 10 MHz frequency.

BRIEF DESCRIPTION OF THE DRAWING

The invention disclosed herein will be understood better with reference to the drawing of which.

DESCRIPTION OF THE PREFERRED EMBODIMENT

Figure 1:
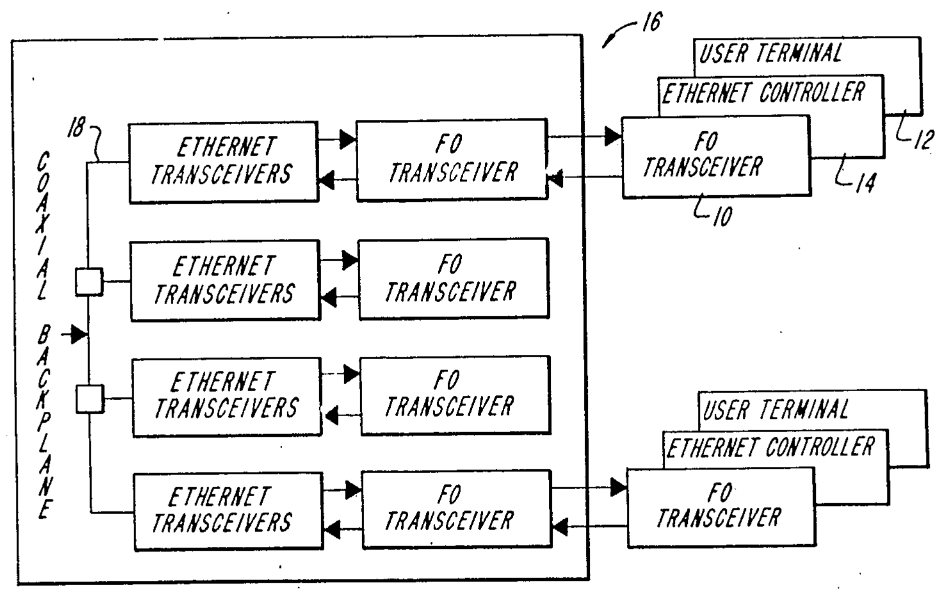
FIG. 1 is a block diagram of a prior art collision detection technique.
Figure 2:
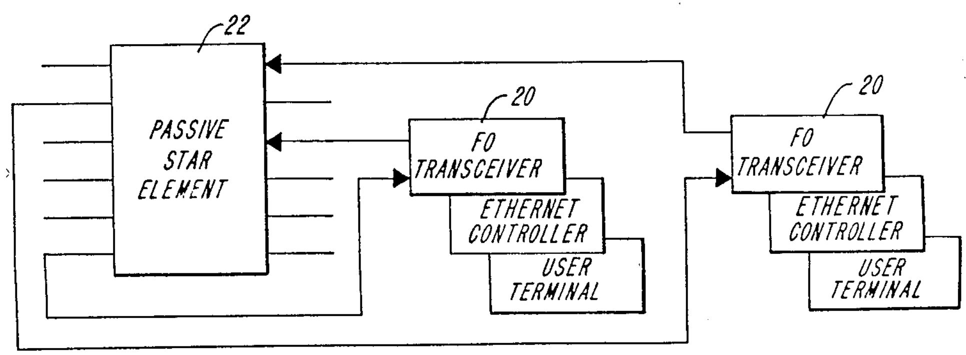
FIG. 2 is a block diagram of a prior art collision detection technique utilizing smart modems.
Figure 3:
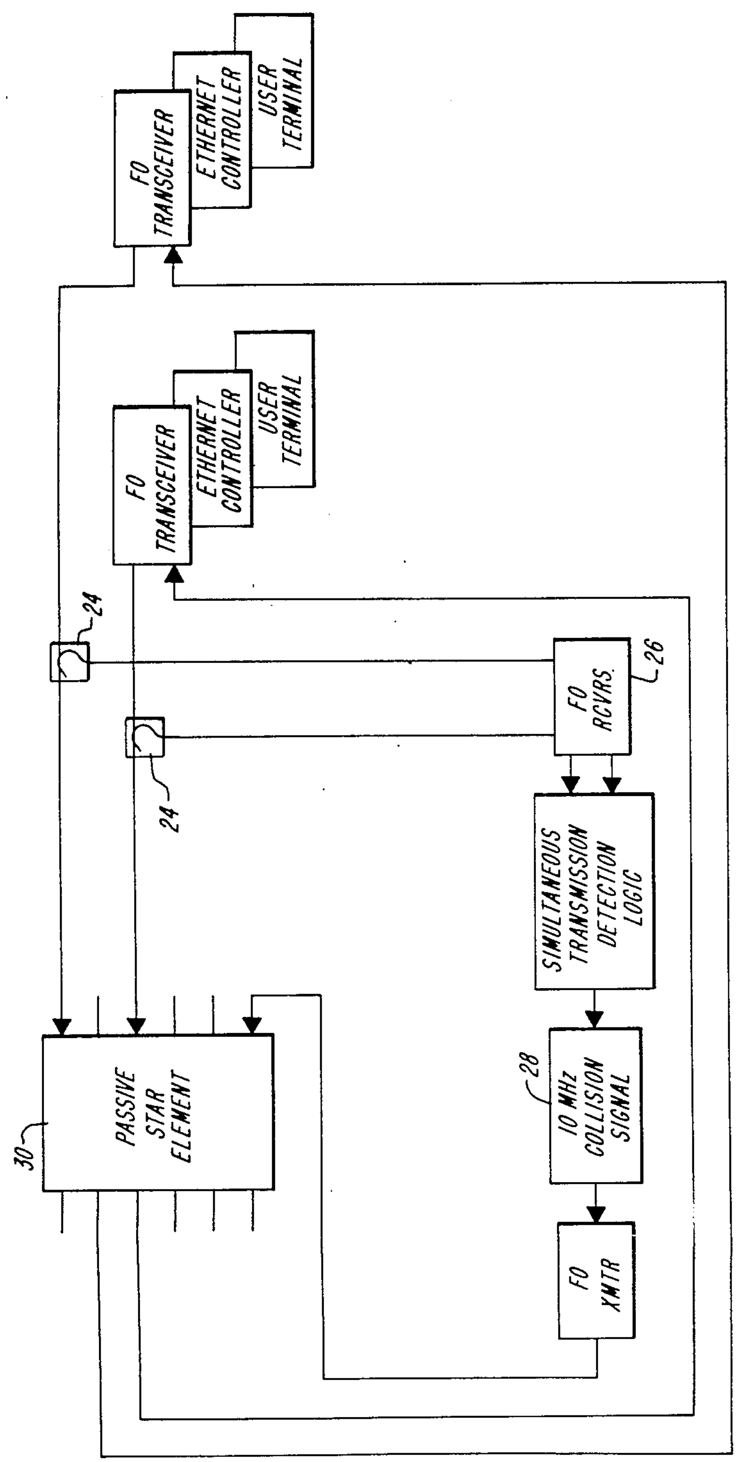
FIG. 3 is a block diagram of another prior art collision detection technique.
Figure 4:
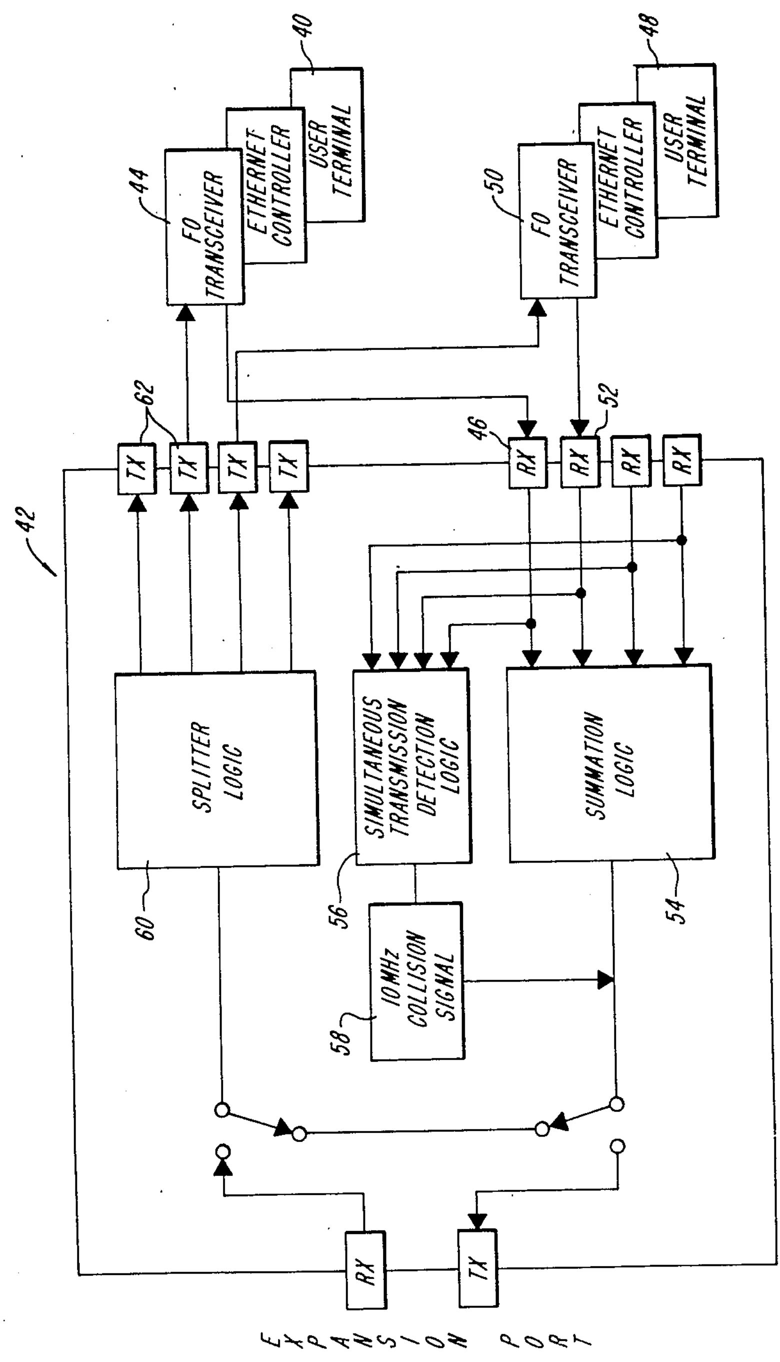
FIG. 4 is a block diagram of the collision detection technique of the present invention.

The technique according to the present invention for providing collision detection on an active star LAN node utilizes aspects of the techniques described in conjunction with FIGS. 1 and 3 above. A mechanization according to the present invention using low cost components is shown in FIG. 4. This mechanization utilizes the node disclosed and claimed in copending U.S. application Ser. No. 913,682 filed Sept. 30, 1986. In the present implementation, a user terminal 40 communicates with an active star node 42 by means of a fiber optic transceiver 44. The signals from the fiber optic transceiver 44 are received by a receiver 46 which is one of a plurality of receivers in the active star node 42. Another user terminal 48 also communicates with the node 42 by means of a fiber optic transceiver 50. It is to be noted that the two user terminals 40 and 48 are entirely exemplary. The node 42 would typically accommodate many user terminals. Signals from the user terminal 48 are received by a receiver 52. The receivers 46 and 52 convert the optical signals to electrical format. As disclosed in the copending application set forth above, the electrical signals from the receivers are summed in a summation logic block 54. The signals from the receivers also enter a simultaneous transmission detection logic element 56. The logic element 56 is adapted to detect simultaneous signals received by the receivers 46 and 52. If a simultaneous transmission is detected, a 10 MHz collision signal block 58 is activated which adds a 10 MHz collision signal to the output of the summation logic block 54. When the active star node 42 is utilized as a headend, the combined signal enters a splitter logic block 60 and is transmitted by the transmitters 62 back to the user terminals interconnected with the node. Because all of the collision detection is done in the star node 42, no logic is required in the optical modem devices of the user terminals. The complexity and hence cost of the optical modem units will therefore be greatly reduced. As disclosed in the referenced patent application, the active star node design permits the development of rooted tree network architectures. Since the collision detection logic is built into the nodes, nearly simultaneous transmissions anywhere in the tree structure will be detected in one of the inbound nodes. It should be noted that since each individual link has been converted to electrical format by the node receivers, no optical taps or separate receivers are required in the present implementation as was the case in the prior art implementation of FIG. 3.

The technique described in this application permits the implementation of collision detection in a fiber optic LAN, employing Ethernet protocol, with a high level of confidence. Because of the design of the active star node, implemented with low cost components, little additional logic is required. By moving the collision detection logic from the optical modem to the star node, the design of the optical modem can be significantly reduced in complexity and cost. It is recognized that modifications and variations of the present invention will occur to those skilled in the art and it is intended that all such modifications and variations be included within the scope of the appended claims.

What is claimed is:

1. Collision detection apparatus in a local network connecting multiple terminals via multiple lines comprising an active star node including a plurality of optical receivers and transmitters that communicate with said terminals over said multiple lines and also including a transmitter and receiver pair that form an expansion port for connection of one star node to other nodes in a branching architecture, characterized by one star node acting in a head end mode to rebroadcast all traffic on the network and other star nodes acting in a repeater mode, logic means interconnected with the output of each of the receivers to detect simultaneous transmission on the network; and means for generating a collision signal when the logic means detects simultaneous transmission, the collision signal being transmitted by the transmitters onto the network.

2. The apparatus of claim 1 wherein the collision signal has a 10 MHz frequency.

3. The apparatus of claim 1 wherein the active star node further includes a summation logic element for receiving signals from the plurality of optical receivers and for generating a combined signal, the collision signal being added to the combined signal.

* * * * *